July 3, 1962     G. T. STOLL     3,042,821
SINGLE PHASE INDUCTION MOTOR
Filed Nov. 10, 1959     2 Sheets-Sheet 1
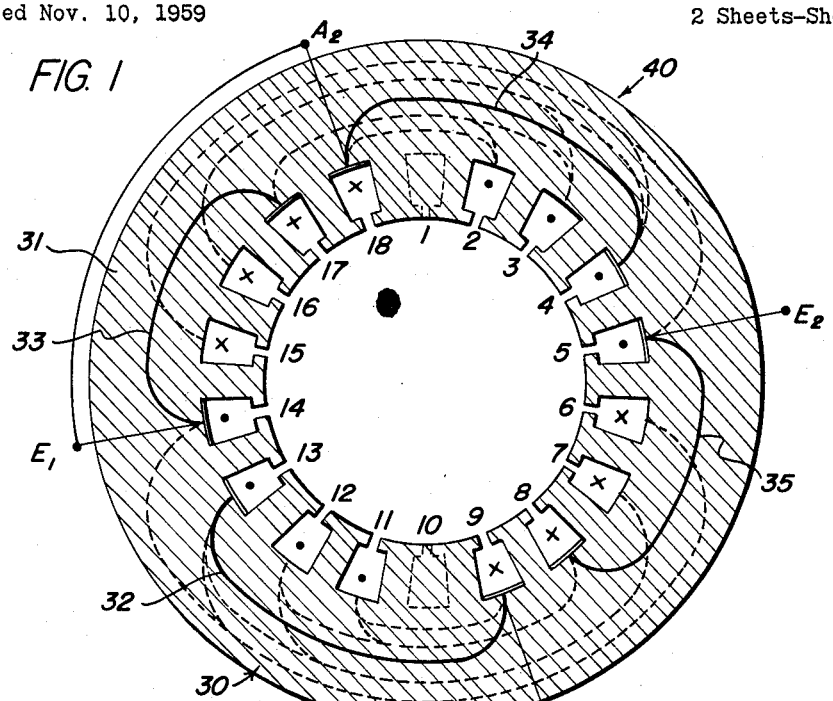
INVENTOR
Gottlieb Theodor Stoll
BY Jerome Bauer
ATTORNEY July 3, 1962 G. T. STOLL 3,042,821
SINGLE PHASE INDUCTION MOTOR
Filed Nov. 10, 1959 2 Sheets-Sheet 2

INVENTOR
Gottlieb Theodor Stoll

BY Jerome Bauer
ATTORNEY

United States Patent Office 3,042,821
Patented July 3, 1962

3,042,821
SINGLE PHASE INDUCTION MOTOR
Gottlieb Theodor Stoll, Eslingen (Neckar), Germany, assignor to Curt Stoll K.G., Maschinen- u. Apparatebau, Neidlingen, Leck, Germany
Filed Nov. 10, 1959, Ser. No. 852,090
Claims priority, application Germany Mar. 7, 1959
12 Claims. (Cl. 310—166)

This invention relates to induction motors, and primarily to single phase induction motors in which the windings are provided with changeable connections to provide selectably variable motor speeds.

Small motors having windings which are selectively connected to provide various types of operation are not new in the art. These motors ordinarily comprise the combination of a shaded pole motor and a single-phase induction motor which has a separate starting winding. Thereby, the motor, which usually has distributed windings laid in slots between the teeth of the stator core, has short-circuited loops, usually at or near the center of the poles, and is used for 2 n-pole operation, whereas the induction motor is used for n-pole operation. Changing from one type of motor operation in which the windings are connected in series to the other type of operation wherein the windings may be fed in parallel, may be accomplished by means of a single switching means.

It is an object of this invention to provide single phase induction motor having selectively interconnectable windings to allow different modes of operation, which motor is not a compromise construction comprising two different motor structures. As a result, the motor of this invention does not use capacitors, centrifugal switches, bimetallic switches, or the like. In addition the starting torque of the motor of this invention is equal to or greater than the starting torques of prior art motors.

It is another object of this invention to provide a new motor structure utilizing main and auxiliary windings positioned on the stator core, such that the auxiliary windings comprise short-circuiting loops, each having one side portion positioned in appropriate slots together with portions of the main windings. The short-circuited loops are so arranged that the side portions form a pole system separate from that of the main windings, and the structure is such that the ratio of the number of the short-circuited loops used to the number of poles selected is an integer which is determined by changes in the interconnection of the main windings.

In addition, a further object of this invention is to provide a motor which, upon occasions when the motor is required to start under an extra-heavy load, may have the windings connected in parallel to provide 2 n-poles for a short period of time. After the motor has come up to speed, the windings may then be reconnected to provide 2 n-poles with the windings connected in series, or to reconnect the windings in parallel to form n-poles. The reconnection to either type of operation may be carried out by means of an appropriate switch provided with either sliding or rotating contacts.

Other objects and advantages of this invention will become more apparent as the detailed description of the invention proceeds in conjunction with the accompanying drawings in which:

FIG. 1 is a sectional view of a stator core having 18 slot positions and schematically illustrating the method in which the windings may be arranged in the slots;

FIG. 2 is a development, also in section, of the stator core of FIG. 1 with the coils connected as shown in FIG. 1;

FIG. 3 is a simple schematic showing of the connections of the two main windings of the stator of FIG. 1;

FIG. 8 is a simplified wiring diagram schematically illustrating a switch which may be used to connect the two windings of the motor of FIGS. 1 and 4 into any of the connections illustrated above.

Figure 4:
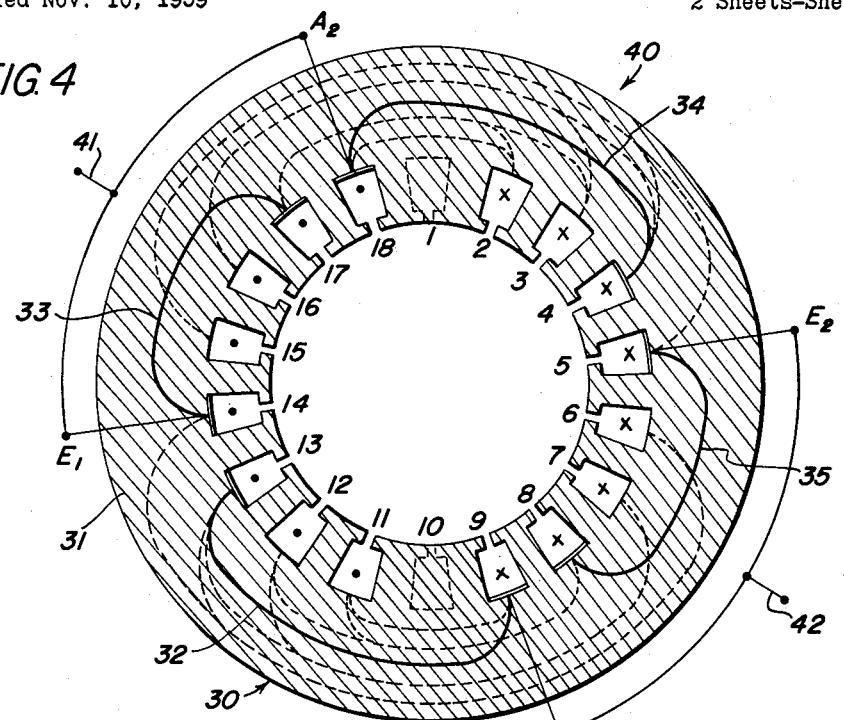
FIG. 4 is a sectional view of the stator core of the motor of FIG. 1 with the windings connected in a different manner.

Referring now to FIG. 1 in detail, the reference character 31 designates the stator core of an induction motor having space for 18 slots, each space being consecutively numbered 1–18. The locations of slots 1 and 10 have been left intact and are therefore shown in dashed lines. The windings 40 and 30 are illustrated schematically distributed in the slots with the dots and x's representing in a conventional manner the relative current flow in the various turns of the two windings. Four short-circuited rings 32, 33, 34 and 35 are schematically shown with the respective side portions of the ring 32 occupying slots 9 and 13 together with appropriate turns of winding 30; the side portions of ring 33 occupying slots 14 and 17; the side portions of ring 34 occupying slots 18 and 4 and the side portions of ring 35 ocupying slots 5 and 8. The effective portions of the rings 32—35 may comprise strips of suitable conductive materials such as aluminum, copper, silver, etc., placed in the bottom portions of the slots with the respective coil sides filling the remainder of the slot space.

In the stator structure of FIGS. 1, 2 and 3, the two main windings 30 and 40 are connected in series to provide 4-pole operation. As shown in FIG. 1 and FIG. 2, the coil 30 occupies slots 6 through 14 and the coil 40 occupies slots 5 through 15. Better illustrated in FIG. 2 is the spiral arrangement of the windings. Each coil comprises two externally exposed contacts or terminals; the coil 30 having terminals $A_1$ and $E_1$, and the coil 40 having terminals $A_2$ and $E_2$. The arrangements of the windings of FIGS. 1, 2, and 3 are such that alternating current energy is supplied to the two terminals $A_1$ and $E_2$ and the terminals $E_1$ and $A_2$ are connected together, forming a series arrangement of the main windings of the motor.

When energized, current flows through the respective turns of the windings 30 and 40 as shown by the arrows. Since, at the instant shown, the current flow is clockwise around both teeth where the slots 1 and 10 would normally be located, two similar poles (designated north on the drawing) are centered about these teeth. The equivalent south poles are located at the teeth between the slots 5 and 6 and slots 14 and 15, or midway between the location of slots 1 and 10. The short-circuited rings 32 through 35 are shown in FIG. 2 in relation to the individual coils of the main windings 30 and 40. The ring 32 has its center located about the tooth which lies between the slots 11 and 12; the ring 33 centers about the tooth located between the slots 15 and 16; while the short-circuited ring 34 centers about the tooth between the two slots 2 and 3. Although shown broken in the development of FIG. 2, the ring 35 extends between the slots 5 and 8 and centers about the tooth between the slots 6 and 7. From this it can be seen that the center of the poles formed by the short-circuited rings are displaced toward the right, as seen in FIG. 2. This displacement amounts to approximately 30 degrees, and the poles formed by the currents flowing in the rings 32 through 35 are displaced approximately 30 degrees from the poles formed by the main windings 30 and 40.

The short-circuited rings 32 through 35 operate to form their own poles due to the currents which are induced in them by the alternating current flow through the main windings 30 and 40. As the current flow in windings 30 and 40 alternates, it creates an alternating magnetic field in the core 31, and the varying magnetic field so produced induces currents in the short-circuited rings 32 through 35. The amplitude of current flowing in the rings is proportional to the flux density in the core 31, and this, in turn, is also dependent upon the amount of current flowing through the main windings 30 and 40. The interaction of the magnetic fields created by the main windings 30 and 40 and the magnetic fields created by the short-circuited rings 32 through 35 produces a rotating magnetic field which applies a torque to the rotor and provides a self-starting single phase motor.

The particular effectiveness of the ring arrangement of the motor of this invention lies in the facts that the rings are made of substantial size to enable them to conduct comparatively large currents and the rings extend over several slots and across coils, ensuring, for example, that one side of a short-circuited ring will have a higher potential induced in it than its other side, thus tending to ensure the flow of current through the short-circuited rings and to further improve the phase shift between the main windings and the short-circuited rings. Consider, for example, the ring 33 which has its left hand (as shown in FIG. 2) side in slot 14 which contains a turn of the coil 30 and has its right hand edge in slot 17 which contains a turn of coil 40. This means that the potentials induced in the two sides of the short-circuited rings 33 will not be equal in amplitude and will be in opposite directions. A substantial flow of current results in the rings 32 through 35 and renders them highly effective as starting windings. In addition, the positions of the short-circuited rings 32 through 35 with respect to the main windings 30 and 40 have been so selected that, even though the main windings may be connected for different modes or speeds of operations than shown in FIGS. 1, 2 and 3, the rings 32 through 35 will automatically produce a system of poles in correct relation to the pole system of the main windings to supply effective starting torques, even under heavy load conditions.

In the stator connected as shown in FIGS. 1, 2, and 3 so that the main windings 30 and 40 form a 4-pole system, each of the four short circuiting rings 32—35 have currents induced in them so that each is effective to form a pole of an auxiliary pole system which is displaced from the main pole system in both time and phase. All four poles of the auxiliary pole system are effective to react with the flux of the main pole system in generating starting torque. However, all four rings are not always effective.

Figure 5:
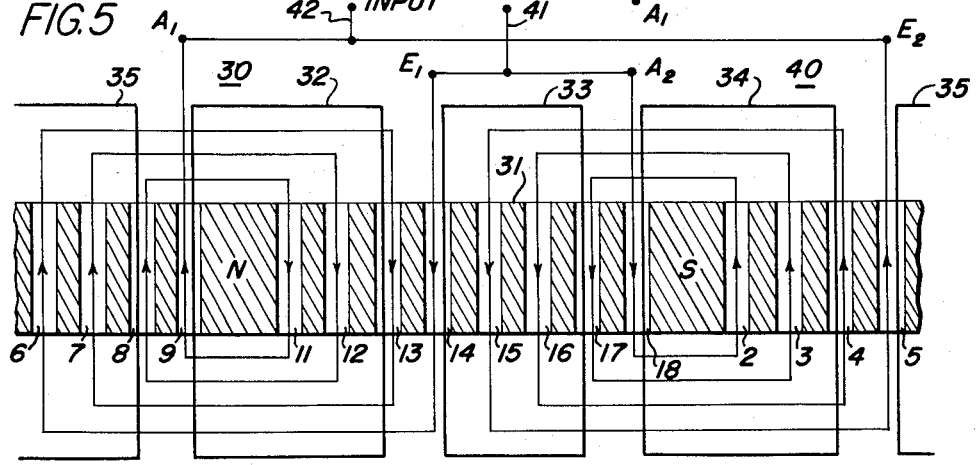
FIG. 5 is a development of the stator core of FIG. 4 illustrating in more detail the main windings of the motor and the manner in which they are connected.

This may be illustrated by reference to FIGS. 4, 5 and 6 wherein the stator core 31 is again illustrated in section with the two windings 30 and 40 shown in the same position as in FIG. 1. The structure of FIGS. 4 and 5 is identical to that of FIG. 1 except for the manner in which the terminals $A_1$ and $E_1$ of winding 30 and terminals $A_2$ and $E_2$ of the winding 40 are connected together. As illustrated in FIG. 1, the stator comprises two separate main power windings 30 and 40 distributed in 16 slots substantially equally spaced about the inner periphery of the stator core. The location of slots 1 and 10 are shown as not punched originally or, if punched, refilled with suitable magnetic material to provide at those positions much larger teeth than between the other slots. The slot positions are numbered consecutively 1–18 and are shown with representative windings or turns therein. Short-circuited rings 32, 33, 34 and 35 are shown having their two sides in appropriate slots together with respective portions of the main windings. The relationships between the various turns of the main windings 30 and 40 and the short-circuited rings 32, 33, 34 and 35 are better illustrated in FIG. 5 which also more clearly shows the manner in which the terminals of the two main windings are connected together to provide parallel energization of the two main windings 30 and 40.

Figure 6:
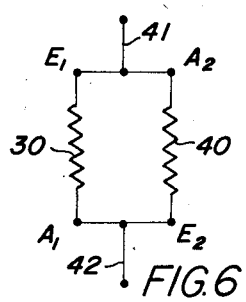
FIG. 6 is a simple schematic showing of the two main windings of the core of FIG. 4 and the manner in which they are connected.

As can better be seen from FIG. 5, the two windings 30 and 40 are connected together in the configuration illustrated by FIGS. 4, 5 and 6. In this particular arrangement the two main windings 30 and 40 are fed in parallel and operate as a two-pole motor, the two poles being centered about the extra wide teeth at slots positions 10 and 1. The short-circuited rings 32—35 again have their sides in slots 9 and 13; 14 and 17; 18 and 4; and 5 and 8 respectively, to automatically produce an additional pole system displaced from the pole system of the main windings when the main windings are energized and induce current flows in the rings 32—35. Considering the rings 32 and 34, their poles would be centered about the tooth between slots 11 and 12 and in the tooth between slots 2 and 3, and these poles would be displaced from the magnetic poles produced by the main windings by an amount similar to that of the arrangement of FIGS. 1 and 2. However, the two rings 33 and 35 are not effective to produce auxiliary poles. FIG. 5 illustrates the relative directions of the current flowing through the coil sides of the main windings 30 and 40. Considering ring 33, the current flowing through the coil side in slot 14 is in the same direction as the current flowing in the coil side 17. Since the two sides of the short-circuiting ring 33 are also in the slots 14 and 17, it becomes evident that the E.M.F. induced in the two sides of the ring 33 will be in the same direction and substantially cancel. The same situation is true for ring 35. From this it can be seen that the distribution of the rings 32—35 with respect to the main windings is such that the number of poles generated by the auxiliary pole system of the short circuiting rings is the same as the number of poles generated by the main windings 30 and 40 even though the main winding connections are changed.

Figure 7:
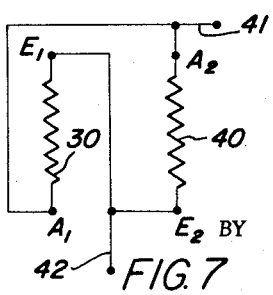
FIG. 7 is a simple schematic showing of the two windings of the stator of FIGS. 1 or 4 showing an alternate method of connection.

FIG. 7 illustrates the connections of the two main power windings 30 and 40 in parallel to produce 4-pole operation. The essential difference between the circuit arrangement of FIGS. 6 and 7 is the manner in which the two windings are connected; the circuit of FIG. 6 producing parallel operation at the two power windings 30 and 40 for 2-pole operation and that of FIG. 7 producing 4-pole operation when the two windings are connected in parallel. The arrangement of the windings connected in parallel as illustrated in FIG. 7 is primarily effective for starting the motor under unusually heavy loads, while the circuit arrangement of FIGS. 3 and 6 are for normal operation at the speeds available for 4-pole operation with the circuit of FIG. 3 and for 2-pole operation with the circuit of FIG. 6.

Of course, the 18 slot stator illustrated in these figures is merely illustrative of the general principles of this invention. Motors having more or less slots may also be used, and the number of short-circuiting rings which are desirable in a motor of the type described herein may be derived from the general equation:

$$Z = \frac{N}{4}$$

where:

Z is the number of short-circuited rings and
N is the number of slots in the stator core.

In the case of a stator design such as illustrated in FIGS. 1 and 4 where some of the slot positions are not milled and are consequently not filled with coils, the equation above should be modified to:

$$Z = \left(\frac{N}{2}\right) - A$$

where A is the number of unopened or refilled slot positions. This design works out so that regardless of the manner in which the main windings are connected, for example as shown in FIGS. 3, 6 and 7, each portion of the main windings, whether in 2- or 4-pole operation, has associated therewith at least one side of a short-circuited ring. In the arrangement shown there is one additional advantage in that in the case of a 12-slot stator core, a deviation from the above mentioned formula, $$Z = \frac{N}{4}$$

is reached since two short-circuited rings operate to provide the advantages of this motor design.

The manner in which the two main windings 30 and 40 may be interconnected in various circuits illustrated heretofore, is shown schematically in FIG. 8 which illustrates a rotary switch having two decks 50 and 60. Each deck comprises a movable conductive switch arm 51 and 61 pivoted about respective pivots 52 and 62. One end of the movable arm 51 has a brush contact 53 and the other has a brush contact 54; and, in the deck 60, one end of the switch arm 61 has a brush contact 63 while the other end has a brush contact 64. The two arms 51 and 61 are mechanically ganged to operate together. Each deck contains a group of three pairs of stationary contacts; the deck 50 having contacts 55, 56, 57, 58 and 59; and the deck 60 having contacts 65, 66, 67, 68, 69 and 71. The two windings 30 and 40 are illustrated with the winding 40 reversed from its showing in FIGS. 3, 6 and 7. The end $A_1$ of winding 30 is connected to the stationary contacts 55 and 58 of the deck 50 and to contact 67 of the deck 60; while the other end of the winding 30, $E_1$, is connected to stationary contact 57 of deck 50 and to the stationary contacts 69 and 66 of the deck 60. The end $A_2$ of the winding 40 is connected to the stationary contacts 56 and 59 of the deck 50 and to the stationary contact 68 of the deck 60, while the other end, $E_2$, of the winding 40 is connected to the input terminal 75 and to the stationary contacts 65 and 71 of the deck 60.

From the circuit arrangement of the FIG. 8 it can be seen that the input terminal 75, to which alternating current is applied, is always connected to the end $E_2$ of the winding 40. The connections of the windings 30 and 40 and the input terminals 75 and 76 are such that with the arms 51 and 61 in position A (contacting stationary contacts 55, 59, 65 and 69) the windings are connected as shown in FIG. 1, and as the arms 51 and 61 are rotated clockwise, the windings are connected as shown in FIGS. 3 and 6, in succession. It is not intended that the wiring diagram of FIG. 8 be considered the only method of connecting the windings of the motor of this invention; rather, it is illustrated as merely one manner in which a pair of power windings may be connected into any of a plurality of circuit arrangements by the operation of a single group of ganged switches.

It has been found that the single phase induction motor utilizing the short-circuited rings of this invention maintains a more even temperature and is consequently more efficient in its operation. When the motor is first started, a high starting current flows through the main windings and induces a large current flow in the loops. Due to the spacing of the short circuited loops with respect to the main windings and due to the fact that the voltages induced in the loops oppose those of the main windings, the E.M.F. in the short-circuited loops is shifted in phase with respect to the E.M.F. of the main windings. After starting, when the motor is at substantially full speed, the current drops to the magnetizing current. Surprisingly, when the motor idles at low load, the current in the short-circuited loops is relatively large. This is probably due to the increased amount of magnetic flux penetrating the moving rotor. When the load is increased, the rotor slips, the magnetic flux shifts in the stator core, and the current flowing in the loops is reduced in proportion. Thus, the total current flow in the stator tends to remain uniform, and there is little variation in temperature between no load and full load. In addition, the efficiency of the motor is maintained high since the losses do not increase with increasing loads to the extent that they do in more usual shaded pole motors.

This specification has described a new single phase, induction-type motor which utilizes short-circuiting rings arranged according to a definite pattern for generating, starting torques of substantial amplitudes in a motor which is readily changeable from one operating condition to another. A reading of this specification may indicate to others skilled in the art, additional embodiments in which the principles of this invention may be used without departing from the spirit thereof. It is, therefore, intended that this invention be limited only by the scope of the appended claims.

What is claimed is:

1. A single phase alternating current motor comprising a stator having coil slots spaced substantially uniformly over its operative surface, an even number of main windings formed of coils and having their individual coils distributed in the slots of said stator, each of said main windings having external terminals, means for connecting said external terminals together and to a source of alternating energy to provide several selective combinations of series and parallel connected coils for said motor to provide selective numbers of magnetic poles, and auxiliary windings on said stator, said auxiliary windings each comprising a short-circuited ring having two of its sides situated in different stator slots together with coils of said main windings, said rings each extending over a finite portion of said stator, said auxiliary windings being inductively energized by said main windings and being so positioned with respect to said main windings as to generate when energized a number of auxiliary magnetic poles equivalent to the number of magnetic poles generated by said main windings in each combination of series and parallel coils in which said main windings are connected, said auxiliary magnetic poles being spaced electrically and spacially from the magnetic poles generated by said main windings.

2. The motor defined in claim 1 wherein said auxiliary windings are so located with respect to said main windings that the auxiliary magnetic poles established by said auxiliary windings are displaced from 20° to 45° from the corresponding magnetic poles established by the main windings.

3. The motor defined in claim 1 wherein the number of short-circuited rings is determined by the equation $$Z = \frac{N}{4}$$

where Z is the number of rings and N is the number of stator slots.

4. The motor defined in claim 1 wherein portions of the operative surface of said stator contain no slots and wherein the number of short-circuited rings is determined by the equation $$Z = \left(\frac{N}{2}\right) - A$$

where Z is the number of rings, N is the number of stator slots, and A is the number of slot positions which contain no slots.

5. The motor defined in claim 1 wherein said means for connecting serves to interconnect said main windings in parallel to provide 2 n-magnetic poles for starting under load and then in series to provide 2 n-magnetic poles for normal operation.

6. The motor defined in claim 1 wherein said means for connecting serves to interconnect said main windings in parallel to provide 2 n-magnetic poles for starting under load and then in parallel to provide n-poles for normal operation.

7. A single phase induction motor comprising a stator having a plurality of coil slots substantially uniformly spaced about its operative surface, an even number of main windings comprising a plurality of coils distributed over the operative surface of said stator with at least one coil side in each slot, external terminals for said coils of said main windings, means for connecting said coil terminals together and to a source of energy to provide several selectible combinations of series and parallel connected coils of said main windings to provide selective numbers and arrangement of main magnetic poles, and a plurality of short-circuited rings distributed over the operative surface of said stator with the sides of each ring situated in different slots whereby each ring extends over a finite portion of said stator, said rings being energized by induction from said main windings and being so arranged with respect to the coils of said main windings as to provide when said main windings are energized an auxiliary magnetic pole system equivalent to the pole system created by the main windings but displaced therefrom in both space and phase in every combination of series and parallel connected main winding coils selected.

8. The motor defined in claim 7 wherein the number of said short-circuited rings is determined by the equation $$Z = \frac{N}{4}$$

where Z is the number of rings and N is the number of coil slots in said stator.

9. The motor defined in claim 7 wherein said stator comprises substantially uniformly spaced unused slots and wherein the number of rings is determined by the equation $$Z = \left(\frac{N}{2}\right) - A$$

where Z is the number of rings, N is the number of slots, and A is the number of unused slots.

10. The motor defined in claim 11 wherein said unused slots are filled with magnetic material.

11. The motor defined in claim 7 wherein said auxiliary magnetic pole system created by said short-circuited rings is displaced in space from the magnetic pole system created by said main winding by from 20° to 45°.

12. In a single phase induction motor which comprises a stator having distributed windings so arranged that they may be connected to provide several different numbers of operative magnetic poles and to provide different arrangements of series and parallel connected windings, auxiliary windings for providing an auxiliary magnetic field which interacts with the magnetic field generated by said distributed windings to provide a resultant rotating magnetic field, said auxiliary windings comprising strips of electrically conductive material supported on said stator in intimate relation with the coil sides of said distributed windings, and means for connecting the ends of said strips together to form short-circuited windings which extend over a finite portion of said distributed windings, said short-circuited windings being arranged in pairs such that one short-circuited winding of each pair lies completely within the physical limits of one of said distributed windings and the other of said pair extends from one to another of said distributed windings, said short-circuited windings being inductively energized when said distributed windings are energized.

References Cited in the file of this patent
UNITED STATES PATENTS

| | | |
|---|---|---|
| 1,269,152 | Becker | June 11, 1918 |
| 1,850,765 | Morrill | Mar. 22, 1932 |

FOREIGN PATENTS

| | | |
|---|---|---|
| 783,259 | Great Britain | Sept. 18, 1957 |